United States Patent [19]
Moreton

[11] Patent Number: 6,117,198
[45] Date of Patent: *Sep. 12, 2000

[54] DETERGENTS FOR HYDROCARBON FUELS

[75] Inventor: David John Moreton, Hull, United Kingdom

[73] Assignee: The Lubrizol Corporation, Wickliffe, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,700

[22] Filed: Sep. 5, 1997

[30] Foreign Application Priority Data

Sep. 5, 1996 [GB] United Kingdom ................... 9618547

[51] Int. Cl.$^7$ .............................. C10L 1/18; C10L 1/22
[52] U.S. Cl. ................................ 44/415; 44/347
[58] Field of Search ............. 44/415, 347, 331, 44/443; 564/47, 342

[56] References Cited

U.S. PATENT DOCUMENTS

| | | | |
|---|---|---|---|
| 3,346,493 | 10/1967 | Le Suer ................................. | 252/32.5 |
| 3,454,496 | 7/1969 | Schlobohm et al. .................... | 508/232 |
| 3,649,229 | 3/1972 | Otto ........................................ | 44/332 |
| 4,533,361 | 8/1985 | Sung et al. ............................. | 44/347 |
| 4,699,724 | 10/1987 | Nalesnik et al. ..................... | 252/51.5 A |
| 5,030,249 | 7/1991 | Herbstman et al. ..................... | 44/347 |
| 5,039,307 | 8/1991 | Herbstman et al. ..................... | 44/347 |
| 5,298,039 | 3/1994 | Mohr ........................................ | 44/443 |
| 5,320,765 | 6/1994 | Fetterman ............................. | 508/475 |

FOREIGN PATENT DOCUMENTS

| | | | |
|---|---|---|---|
| 486 835 A1 | 5/1992 | European Pat. Off. . | |
| 486835 | 5/1992 | European Pat. Off. ..... | C10M 159/16 |
| 545 653 A1 | 6/1993 | European Pat. Off. . | |
| 647 700 A1 | 4/1995 | European Pat. Off. . | |
| 1560442 | of 0000 | France . | |
| 51 008 304 | of 0000 | Japan . | |
| 2 017 108 | 10/1979 | United Kingdom . | |
| 2017108 | 10/1979 | United Kingdom ............. | C08F 8/00 |
| 85/03504 | 8/1985 | WIPO . | |

Primary Examiner—Margaret Medley
Assistant Examiner—Cephia D. Toomer
Attorney, Agent, or Firm—Michael F. Esposito; Samuel B. Laferty

[57] ABSTRACT

Compounds comprising a Mannich reaction product of
a) polyisobutene-substituted alkylated succinimide, wherein the alkylated succinimide is derived from a succinate and an alkylene polyamine;
b) an aldehyde;
c) an alkyl substituted phenol;
are disclosed, which are shown to have good detergency properties in hydrocarbon fuels.

19 Claims, No Drawings

DETERGENTS FOR HYDROCARBON FUELS

The present invention relates to detergents for use in hydrocarbon fuels. Hydrocarbon fuels generally contain numerous deposit-forming substances. When used in internal combustion engines, deposits tend to form on and around constricted areas of the engine which are in contact with the fuel. In diesel engines, deposits tend to accumulate in the fuel injection system, thereby hampering good performance of the engine. In automobile engines deposits can build up on engine intake valves leading to progressive restriction of gaseous fuel mixture flow into the combustion chamber and also to valve sticking. It is common practice therefore to incorporate a detergent in the fuel composition for the purpose of inhibiting the formation, and facilitating the removal, of engine deposits, thereby improving engine performance.

U.S. Pat. No. 5,039,307 discloses coupled bis-succinimides, formed by the reaction of an alkenyl bis-succinimide, nonylphenol and formaldehyde, for use as detergent additives in diesel fuels. U.S. Pat. No. 5,039,249 discloses the same compounds in gasoline fuels. These compounds are said to reduce intake valve deposits.

We have discovered novel Mannich condensation products of polyisobutene-substituted succinimides, an aldehyde and alkyl substituted phenols which are excellent detergents in fuels. Accordingly in a first aspect the present invention provides a compound comprising a Mannich reaction product of a) a polyisobutene-substituted alkylated succinimide, wherein the alkylated succinimide is derived from a succinate and an alkylene polyamine;
b) an aldehyde;
c) an alkyl substituted phenol.

A second aspect of the invention provides provides a fuel composition comprising a major amount of a hydrocarbon fuel, and from 10 to 1000 ppm of the above reaction product.

The polyisobutene (PiB) on the succinimide preferably has a number average molecular weight of from 700 to 2300, preferably from 750 to 1500. It may be derived from a "highly-reactive" PIB, that is one in which at least 70% of the terminal olefinic double bonds are vinylidene, or a "standard" PIB containing a lower proportion of vinylidene double bonds, such as that sold by BP Chemicals under the trade mark Hyvis®.

The alkylated succinimide is the reaction product of a succinate and an alkylene polyamine, which is preferably of the formula H—(NRC$_x$H$_y$)$_n$—NH$_2$, where R is H or (C$_1$–C$_6$) alkyl, n is an integer of from 1 to 7, and x is 2 or 3 and y is 4 or 6. Preferred alkylene polyamines are ethylene polyamines (R=H, x=2, y=4), particularly ethylene diamine, diethylene triamine, triethylene tetramine and tetraethylene pentamine.

The aldehyde is preferably a (C$_1$–C$_6$) aldehyde, preferably formaldehyde.

The alkyl substituted phenol is preferably of the formula Ph(OH)(R'), where R' represents one or two alkyl groups independently having molecular weights of from 15 to 3000. R' preferably represents just one alkyl group, para to the OH group, and more preferably a (C$_3$–C$_{22}$) alkyl group which may be straight or branched, and which includes alkyl groups derived from propylene oligomers; most preferably R' is —C$_{12}$H$_{25}$ (dodecyl phenol).

Particularly preferred products comprise the reaction product of a) a polyisobutene-substituted alkylated succinimide, wherein the alkylated succinimide is derived from a succinate and an ethylene polyamine;
b) formaldehyde;
c) dodecyl phenol.

As mentioned above, the compounds of the invention are made by a Mannich reaction involving an alkylated succinimide, aldehyde and a substituted phenol. Hence the aldehyde and phenol can attach to any NH group on the succinimide, although the usual point of attachment is at the terminal —NHR group. Alkylated succinimides are well known, and the conditions required for Mannich reactions will also be familiar to those skilled in the art. Another aspect of the invention therefore provides a process for producing a compound of Formula (I) above, comprising reacting together a substituted phenol as defined above, an aldehyde, and an alkylated succinimide as defined above, under conditions suitable for a Mannich condensation reaction.

In a further aspect the invention provides an additive package for a fuel composition, comprising from 5 to 30% by weight of a compound as defined above in a solvent comprising an alkoxylated alkyl phenol and optionally other aromatic solvents.

It is preferred that the compound of the invention is present in the fuel composition in the form of an additive package, the package being present at a level of from 200 to 3000 ppm, preferably from 600 to 1000 ppm. Thus another aspect of the invention provides an additive package for a fuel composition, comprising from 5 to 30% by weight of a compound as defined above, a carrier fluid, and optionally a solvent, preferably an aromatic solvent. Suitable carrier fluids include alkyl phenols, optionally alkoxylated; esters of acids/alcohols, acids/polyols or acids/glycol ethers, the acids being saturated or unsaturated; phthalate esters; trimellitate esters; alkoxylated alcohols or polyols; polyalkylene glycols; and lubricating oils. Suitable solvents may include most known aromatic or aliphatic hydrocarbons or glycol ethers. The invention also comprises in a still further aspect the use of the above compounds and additive packages as detergents in hydrocarbon fuels.

The hydrocarbon fuel may suitably comprise a hydrocarbon fraction boiling in the gasoline range or a hydrocarbon fraction boiling in the diesel range. Gasolines suitable for use in spark ignition engines, e.g. automobile engines, generally boil in the range from 30 to 230° C. Such gasolines may comprise mixtures of saturated, olefinic and aromatic hydrocarbons. They may be derived from straight-run gasoline, synthetically produced aromatic hydrocarbon mixtures, thermally or catalytically cracked hydrocarbon feedstocks, hydrocracked petroleum fractions or catalytically reformed hydrocarbons. The octane number of the base fuel is not critical and will generally be above 65. In the gasoline, hydrocarbons may be replaced in part by alcohols, ethers, ketones or esters, typically in an amount up to 20% by weight. Alternatively, as the liquid hydrocarbon fuel there may be used any fuel suitable for operating spark compression engines, such as those which may be found in road vehicles, ships and the like. Generally, such a diesel fuel will boil in the range from about 140° C. to about 400° C. (at atmospheric pressure), particularly in the range from about 150 to 390° C., especially from about 175 to 370° C. Such fuels may be obtained directly from crude oil (straight-run) or from a catalytically or thermally cracked product or a hydrotreated product, or from a mixture of the aforesaid. Alternatively there may be used a biofuel, for example rape seed methyl ester. The cetane number will typically be in the range from 25 to 60.

The fuel composition contains the compound of the invention in an amount sufficient to provide dispersancy. Typically in a gasoline fuel this amount will be in the range from 20 to 1000 ppm w/w based on the total weight of the composition. Typically in a diesel fuel this amount will be in the range from 10 to 500 ppm w/w based on the total weight of the composition.

The fuel composition may suitably be prepared by blending an additive composition comprising a fuel compatible hydrocarbon solvent and the compound of the invention with the hydrocarbon fuel.

The fuel composition in addition to the compound of the invention may contain other known additives. The nature of the additives will depend to some extent on the end-use of the fuel composition. Diesel fuel compositions may contain nitrates or nitrites as a cetane improver, or copolymers of ethylene and/or vinylesters, e.g. vinylacetate, as a pour point depressant. Gasoline fuel compositions may contain a lead compound as an anti-knock additive and/or an antioxidant, e.g. 2,6-di-tert-butyl phenol, and/or an anti-knock compound other than a lead compound, and/or an additional dispersant, for example a PIB polyamine. The other additives (if any) may be blended directly into the fuel composition or may be incorporated by way of a concentrate composition.

The compounds of the invention may be made by methods well known in the art, using the Mannich condensation reaction. The preferred method is to react an alkyl (usually polyisobutene) succinnate with an alkylene polyamine and then use the product in a Mannich reaction with formaldehyde and dodecyl phenol.

The invention will now be further illustrated by reference to the following examples.

EXAMPLE 1
Preparation of polyisobutene succinate/triethylene tetramine adduct A 2 liter round-bottomed flange flask was charged with 1000 g (0.624 mol) of a solution of 75% polyisobutene succinate (obtained by reacting the polyisobutene Hyvis® 10, Mw c. 1000, with maleic anhydride) in 25% HAN8572, an aromatic solvent available from Exxon Chemicals. This was heated with stirring to 175° C., following which triethylene tetramine (TETA) (79.4 g, 0.543 mol) was added dropwise using a pressure equalising funnel over 35 minutes. The reaction mixture was then heated at 175° C. for a further four hours. The resulting product was filtered through a 12 mm Celite pad whilst still warm, and analysed. The product was found to be 71.8% pure, with a nitrogen content of 2.75% (theoretical 2.85%).

EXAMPLE 2
Preparation of adduct of polyisobutene succinate, triethylene tetramine (TETA), formaldehyde and dodecyl phenol The product of Example 1, in the form of a 75% solution in 25% HAN8572, was charged to a 500 ml round-bottomed flask (173.1 g, 0.1 mol), together with paraformaldehyde (3.0 g, 0.1 mol) and dodecyl phenol (26.8 g, 0.1 mol), together with 100 g of toluene as solvent. The reaction mixture was heated rapidly to 100° C. and then to 127° C. as distillation occurred over 90 minutes. The mixture was then held at 127° C. for a further three hours. 1.8 ml of water was collected. The product was then transferred to a 500 ml Florentine flask and stripped of toluene on a rotary evaporator at 80° C. 29' Hg. The product was then filtered warm through a 12 mm Celite pad. The product was found to be 68.2% pure, with a nitrogen content of 2.22% (theoretical 2.37%).

EXAMPLE 3
Preparation of adduct of polyisobutene succinate, ethylene diamine (EDA), formaldehyde and dodecyl phenol The procedure and reactants of Examples 1 and 2 were followed, except that instead of triethylene tetramine, 32.6 g (0.543 mol) of ethylene diamine (EDA) was used in the first stage, and then 161.6 g (0.1 ml) of the resultant product as a 75% solution in 25% HAN8572 was used in the Mannich reaction. Analysis revealed 1.15% nitrogen, alkalinity value of 7.5 mgKOH $g^{-1}$.

EXAMPLE 4
Preparation of adduct of polyisobutene succinate, diethylene triamine (DETA), formaldehyde and dodecyl phenol The procedure and reactants of Examples 1 and 2 were followed, except that instead of triethylene tetramine, 56.02 g (0.543 mol) of diethylene triamine (DETA) was used in the first stage, and then 167.4 g (0.1 ml) of the resultant product as a 75% solution in 25% HAN8572 was used in the Mannich reaction. Analysis revealed 1.72% nitrogen, alkalinity value of 24.3 mgKOH $g^{-1}$.

EXAMPLE 5
Preparation of adduct of polyisobutene succinate, tetraethylene pentamine (TEPA), formaldehyde and dodecyl phenol The procedure and reactants of Examples 1 and 2 were followed, except that instead of triethylene tetramine, 102.8 g (0.543 mol) of tetraethylene pentamine (TEPA) was used in the first stage, and then 178.8 g (0.1 ml) of the resultant product as a 75% solution in 25% HAN8572 was used in the Mannich reaction. Analysis revealed 2.91% nitrogen, alkalinity value of 64.8 mgKOH $g^{-1}$.

ENGINE TESTS

The compounds prepared in the Examples above were evaluated as detergency additives in fuels according to a standard engine test, following method CEC F-05 A-93 on a Mercedes Benz M 102.982 engine. The fuel employed was unleaded CEC RF 83-A-91, and the oil RL-189/1. The compounds tested were incorporated in an additive package with the following formulation:

paradodecylphenol/propylene oxide (11:1 mol ratio) carrier—37.9% by weight
HAN 8572 (Exxon Chemicals) aromatic solvent—37.2% by weight
additive of Examples 2–5—24.9% by weight
The package was dosed in the fuel at 800 ml/m$^3$.

Measurements were made of the inlet valve deposits, and the valves were also given a visual rating. In this test a visual rating of 9.5 or greater is considered to be a good result.

TABLE 1

| EXAMPLE | DEPOSITS (mg) | AVE. VISUAL RATING |
|---|---|---|
| no additive package | 278 | 7.59 |
| 2 (TETA) | 3 | 9.87 |
| 3 (EDA) | 109 | 8.42 |
| 4 (DETA) | 33 | 9.37 |
| 5 (TEPA) | 10 | 9.70 |

These results show that the triethylene tetramine (TETA) adduct is the best fuel detergent, and the TEPA adduct is also considered very good.

I claim:

1. A fuel composition comprising a hydrocarbon fuel and an additive package comprising 5 to 30% by weight of a Mannich reaction product, a carrier fluid and a solvent, said Mannich reaction product being derived from:

(a) a polyisobutene-substituted succinimide, wherein the succinimide is derived from a succinate and an alkylene polyamine;
(b) an aldehyde; and
(c) an alkyl substituted phenol, the concentration of said Mannich reaction product in said fuel being from 10 to 1,000 ppm by weight.

2. The fuel composition of claim 1 wherein said carrier fluid is an alkoxylated alkyl phenol.

3. The fuel composition of claim 1 wherein said solvent is an aromatic solvent.

4. The fuel composition of claim 1 wherein said polyisobutene has a number average molecular weight of 700 to 2300.

5. The fuel composition of claim 1 wherein said polyisobutene has a number average molecular weight of 750 to 1500.

6. The fuel composition of claim 1 wherein said aldehyde is a ($C_1$–$C_6$) aldehyde.

7. The fuel composition of claim 1 wherein said aldehyde is formaldehyde.

8. The fuel composition of claim 1 wherein the alkylene polyamine is represented by the formula H—(NRC$_x$H$_y$)$_n$—NH$_2$, wherein R is H or ($C_1$–$C_6$) alkyl, n is an integer of from 1 to 7, x is 2 or 3, and y is 4 or 6.

9. The fuel composition of claim 1 wherein the alkylene polyamine is an ethylene polyamine.

10. The fuel composition of claim 1 wherein the alkylene polyamine is ethylene diamine, diethylene triamine, triethylene tetramine or tetraethylene pentamine.

11. The fuel composition of claim 1 wherein the alkyl substituted phenol is represented by the formula Ph(OH)(R'), where R' represents one or two alkyl groups independently having molecular weights of from 15 to 3000.

12. The fuel composition of claim 11 wherein R' represents one alkyl group para to the OH group.

13. The fuel composition of claim 11 wherein R' represents one alkyl group para to the OH group, said one alkyl group being a ($C_3$–$C_{22}$) alkyl group.

14. The fuel composition of claim 11 wherein R' represents one alkyl group para to the OH group, said one alkyl group being derived from a propylene oligomer.

15. The fuel composition of claim 11 wherein R' represents one alkyl group para to the OH group, said one alkyl group being —$C_{12}H_{25}$.

16. The fuel composition of claim 1 wherein said hydrocarbon fuel is gasoline.

17. The fuel composition of claim 1 wherein said hydrocarbon fuel is diesel fuel.

18. The fuel composition of claim 16 wherein the concentration of the Mannich reaction product in the fuel is the range from 20 and 1000 ppm.

19. The fuel composition of claim 17 wherein the concentration of the Mannich reaction product in the fuel is in the range from 10 to 500 ppm.

* * * * *